United States Patent
Hamada et al.

(10) Patent No.: US 8,864,218 B2
(45) Date of Patent: Oct. 21, 2014

(54) VEHICULAR CEILING ASSEMBLY AND VEHICULAR ROOF ASSEMBLY

(71) Applicant: Toyota Boshoku Kabushiki Kaisha, Aichi-ken (JP)

(72) Inventors: Hideaki Hamada, Kakamigahara (JP); Haruo Horikawa, Toyoake (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/795,696

(22) Filed: Mar. 12, 2013

(65) Prior Publication Data

US 2013/0257109 A1    Oct. 3, 2013

(30) Foreign Application Priority Data

Mar. 30, 2012  (JP) .................................. 2012-079819

(51) Int. Cl.
*B60Q 3/02*  (2006.01)
*B60R 21/04*  (2006.01)
*B62D 25/06*  (2006.01)

(52) U.S. Cl.
CPC .............. *B60Q 3/0203* (2013.01); *B62D 25/06* (2013.01); *B60R 21/04* (2013.01); *B60R 2021/0442* (2013.01)
USPC ............ 296/214; 296/211; 296/215; 362/549

(58) Field of Classification Search
CPC  B62D 25/06; B60R 13/02; B60R 2021/0442; B60R 21/04; B60Q 3/0203
USPC ........... 296/210, 211, 214, 215; 362/544, 549
See application file for complete search history.

(56) References Cited

FOREIGN PATENT DOCUMENTS

| JP | 2003-341438 | 12/2003 |
|----|-------------|---------|
| JP | 2008-308092 | 12/2008 |

*Primary Examiner* — Glenn Dayoan
*Assistant Examiner* — Melissa A Black
(74) *Attorney, Agent, or Firm* — Greenblum & Bernstein, P.L.C.

(57) ABSTRACT

A vehicular ceiling assembly includes a ceiling board, a functional component, a bracket including a mount and a shock absorber. The bracket is mounted to an upper surface of the ceiling board to fix the functional component to the ceiling board. The bracket is arranged such that the mount is positioned above the functional component in a vehicle height direction and the shock absorber is in contact with a lower surface of a roof of the vehicle.

19 Claims, 4 Drawing Sheets

VEHICULAR CEILING ASSEMBLY AND VEHICULAR ROOF ASSEMBLY

CROSS REFERENCE TO RELATED APPLICATION

This application claims priority from Japanese Patent Application No. 2012-79819 filed on Mar. 30, 2012. The entire contents of the priority application are incorporated herein by reference.

FIELD OF THE INVENTION

The present disclosure relates to a vehicular ceiling assembly and vehicular roof assembly in which a functional component is attached to a ceiling board.

BACKGROUND OF THE INVENTION

A known roof assembly includes a functional component such as a map lamp attached to a ceiling board. The roof assembly further includes a frame shaped bracket and the like that attaches a main body of the map lamp to the ceiling board. The ceiling board includes a hole to which the main body is inserted. The main body includes a flange extending along an outer periphery of the main body. The main body is inserted into the hole of the ceiling board such that an edge portion of the hole is held between the flange and the bracket. Thus, the map lamp is attached to the ceiling board.

Further, a known structure reduces deformation of a ceiling board toward an upper side in a vehicle height direction. Hereinafter, this deformation is referred to as loosening of a ceiling. The structure includes shock absorbers such as shock absorbing pads at predetermined intervals. The shock absorbing pads are arranged between the ceiling board and an inner panel to reduce the loosening of the ceiling.

Generally, a space is formed between an upper surface of a map lamp and a lower surface of a roof panel in the vehicle height direction. The shock absorbers may be arranged in the space to effectively use the space. However, the shock absorbers cannot be attached to the upper surface of the map lamp that has uneven shape, for example. In such a case, the space between the upper surface of the map lamp and the lower surface of the roof cannot be effectively used to reduce the loosening of the ceiling.

SUMMARY OF THE INVENTION

The present invention has been made in view of the aforementioned circumstances. An objective of the present invention is to reduce the loosening of the ceiling by use of a space between an upper surface of a functional component such as a map lamp and a lower surface of a roof panel.

A technology disclosed herein relates to a vehicular ceiling assembly including a ceiling board, a functional component, and a bracket including a mount and a shock absorber. The bracket is mounted to an upper surface of the ceiling board to fix the functional component to the ceiling board. The bracket is arranged such that the mount is positioned above the functional component in a vehicle height direction and the shock absorber is in contact with a lower surface of a roof of the vehicle. The shock absorber may include a plurality of resin ribs that integrally protrude from the mount to the roof. Alternatively, the mount may be a separate member from the shock absorber. A shock absorber including resin ribs may be mounted on the mount, or a flexible shock absorber such as urethane pad and felt pad may be mounted on the mount. The roof to be in contact with the shock absorber may be an inner panel or an outer panel of the roof.

DETAILED DESCRIPTION OF THE PREFERRED EMBODIMENTS

Figure 1:
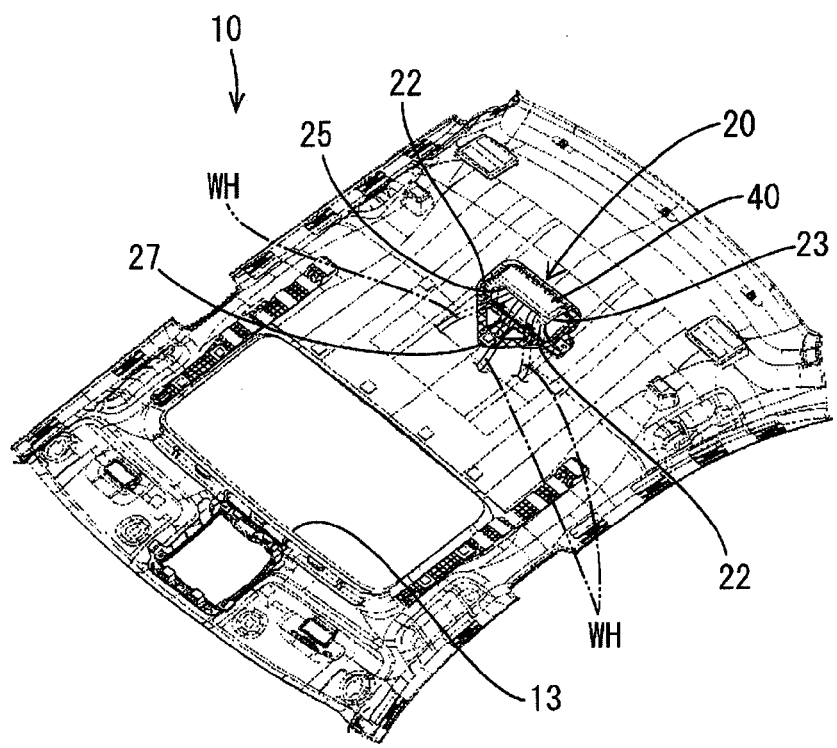
FIG. 1 is a perspective view of a ceiling board with a bracket attached to an upper surface of the ceiling board.

An embodiment according to the present invention will be explained with reference to FIGS. 1 to 4. As illustrated in FIG. 1, a vehicular ceiling assembly 1 includes a ceiling board 10 and a bracket 20. The bracket 20 fixes a map lamp 30 to the ceiling board 10. The map lamp 30 is one example of functional components of the vehicle. The functional components have some kinds of functions convenient for occupants of the vehicle. The ceiling board 10 is made of a synthetic resin such as polypropylene, or a mixture of a synthetic resin material and one of an inorganic material and a wood-based material, for example. In the following description, a front side corresponds to a left side in FIG. 3 (a front side of a vehicle), and a rear side corresponds to a right side in FIG. 4 (a rear side of a vehicle).

Figure 3:
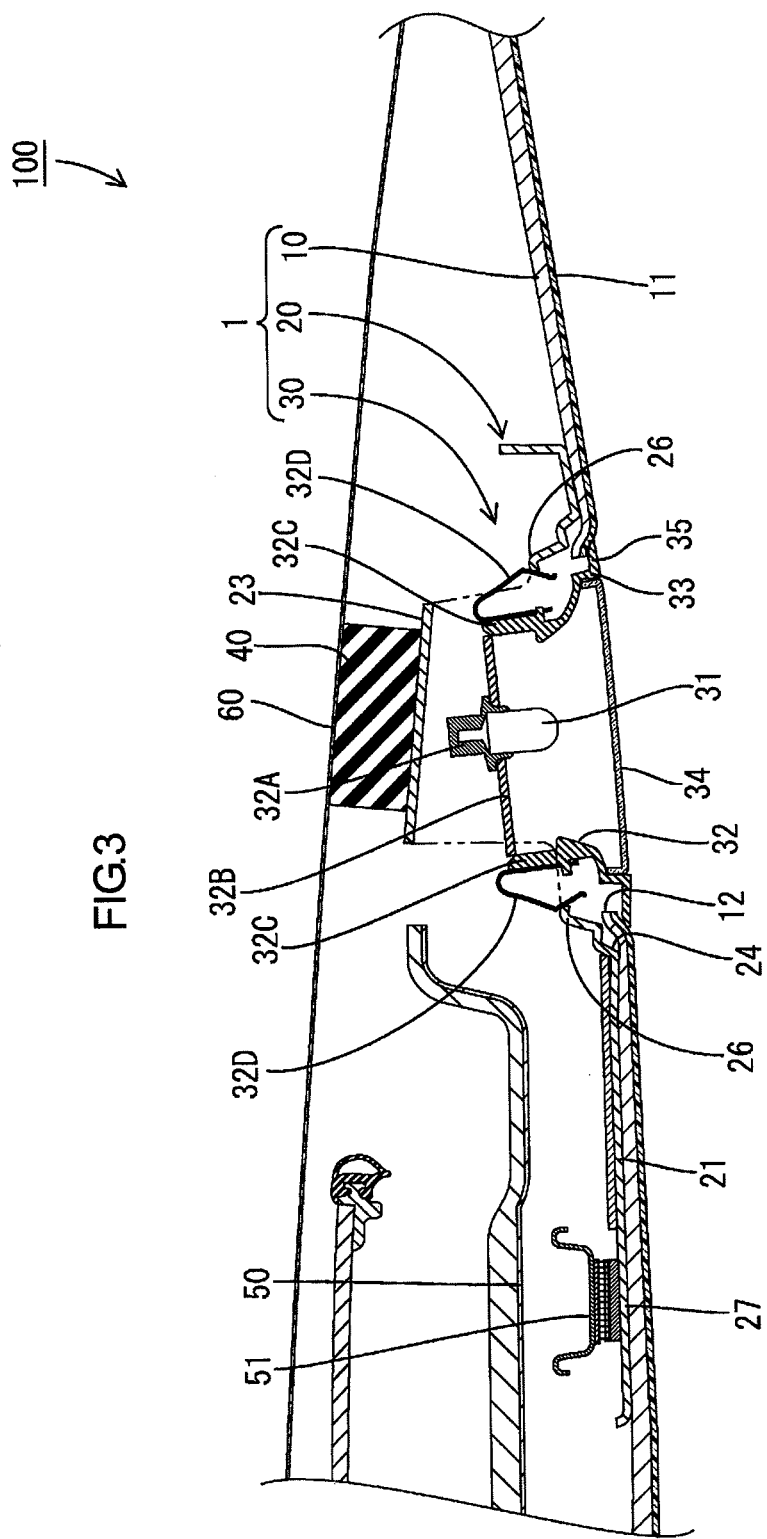
FIG. 3 is a cross-sectional view of a vehicular ceiling assembly taken vertically along a front to rear direction of a vehicle.

As illustrated in FIG. 3, a roof assembly 100 includes the ceiling assembly 1, the map lamp 30, an inner panel 50, and an outer panel 60. As illustrated in FIG. 3, the inner panel 50 is provided above the ceiling board 10 (on an upper side in a vehicle height direction) and the outer panel 60 is provided above the inner panel 50. An interior cover 11 is attached to a lower surface of the ceiling board 10 (on a surface of the ceiling board 10 facing a vehicle compartment).

The outer panel 60, which is an exterior panel of the vehicle, is provided over the entire area of the ceiling board 10. The inner panel 50 has some void areas. Thus, the outer panel 60 and the ceiling board 10 face each other through the void areas of the inner panel 50. For example, a part of the inner penal 50 is present in front of the map lamp 30 in FIG. 3, no parts of the inner panel 50 are present above or behind the map lamp 30.

The roof assembly 100 may include a sunroof (not illustrated) allowing light to enter the vehicle compartment. As illustrated in FIG. 1, the ceiling board 10 includes a roof opening 13 at a position corresponding to the sunroof. The map lamp 30 is arranged on the rear of the roof opening 13.

As illustrated in FIG. 3, the map lamp 30 includes light bulbs 31, a lamp body 32 with an opening 33, and a lamp cover 34 that covers the opening. Further, the lamp body 32 includes a flange 35 that radially protrudes outward from an edge of the opening 33 of the lamp body 32 for an entire circumference.

The ceiling board 10 further includes a lamp hole 12 at a position corresponding to the map lamp 30. The map lamp 30 is arranged in the lamp hole 12 such that the light bulb 31 faces the vehicle compartment. The edge of the lamp hole 12 is positioned above the flange 35 so as not to be seen from the vehicle compartment.

Figure 4:
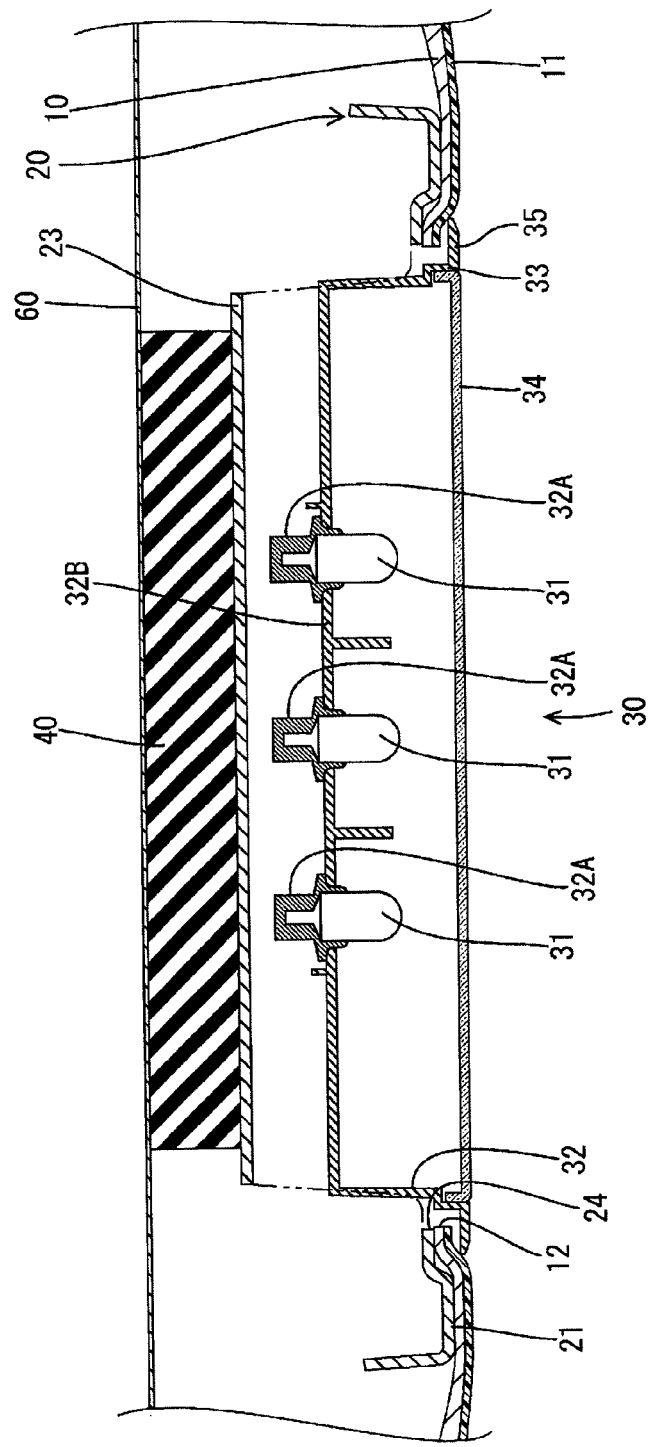
FIG. 4 is a cross-sectional view of the vehicular ceiling assembly taken vertically along a width direction of the vehicle.

The lamp body 32 is described in more detail. The lamp body 32 includes lamp sockets 32A, a socket holder 32B, retaining portions 32C, and four clips 32D. The lamp sockets 32A hold the light bulbs 31, respectively. The socket holder 32B holds the lamp sockets 32A. The retaining portions 32C are arranged in front of and behind the socket holder 32B such that the socket holder 32 is retained therebetween. The clips 32D are attached to the retaining portions 32C. As illustrated in FIG. 4, three lamp sockets 32A are arranged at equal intervals in the width direction of the vehicle.

Figure 2:
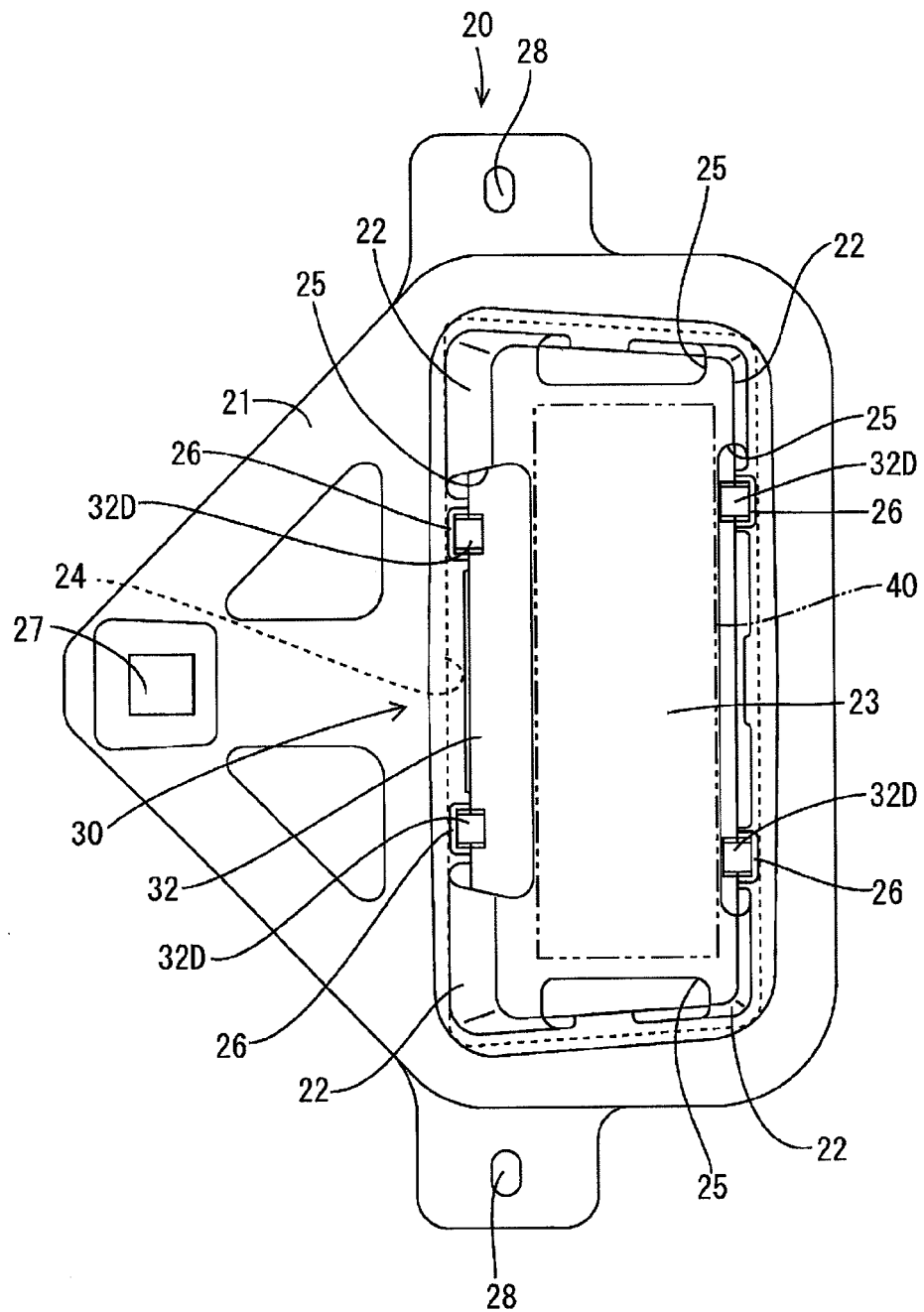
FIG. 2 is a plan view of the bracket.

The map lamp 30 is fixed to the ceiling board 10 with the bracket 20. As illustrated in FIG. 2, the bracket 20 includes a base plate 21, pillars 22, a mount 23, and a mounting hole 24. The base plate 21 is arranged along an upper surface (the upper surface in the vehicle height direction) of the ceiling board 10. The pillars 22 rise upward from the base plate 21. The mount 23 is connected to the pillars 22. The mount 23 has a smaller area than the mounting hole 24 of the base plate 21. Thus, the pillars 22 each rise obliquely from the edge of mounting hole 24 to the edge of the mount 23. The mount 23 is arranged above the map lamp 30 at a position close to the outer panel 60. The base plate 21 includes a mounting hole 24 at a position corresponding to the lamp opening 12 of the ceiling board 10. The mounting hole 24 also corresponds to the mount 23. The mounting hole 24 has a rectangular shape elongated in the vehicle width direction. The pillars 22 are arranged at corners of the mounting hole 24, thereby providing a housing space surrounded by the pillars 22 and the mount 23. The map lamp 10 is arranged in the housing space. The pillars 22 are positioned at all corners of the mounting hole 24 along each corner including a part of each of a short side and a long side of the mounting hole 24.

A space 25 is provided between the pillars 22 adjacent to each other on the same side. The space 25 is positioned on each long side of the mounting hole 24 at opposing positions and on each short side of the mounting hole 24 at opposing positions. As illustrated in FIG. 1, wire harnesses WH are passed through the opening 25 to be connected to the lamp body 32. The wire harness WH may be a power cable, or a signal cable for switching on and off the map lamp 30.

As illustrated in FIG. 2, the clips 32D on each long side of the mounting hole 24 protrude upward through the space 25. The clips 32D each have a U shape that opens downward. The clips 32D are arranged in the spaces 25 between the pillars 22 such that two of the clips 32D are positioned on each of opposing sides of a mounting hole 24. As illustrated in FIG. 3, the bracket 20 includes retainers 26 each protrude from the edge of the mounting hole 24. The clips 32D each are arranged to be engaged with the retainers 26 from the upper side. With this configuration, the lamp body 32 is held in the mounting hole 24 of the bracket 20 so as not to drop off downwardly. In other words, the bracket 10 fixes the map lamp 30 to the ceiling board 10. In this state, a lower surface of the ceiling board 10, a lower surface of the flange 35, and a lower surface of the lamp cover 34 are flush with each other.

The base plate 21 is bonded to an upper surface of the ceiling board 10 with a hot-melt adhesive, for example. As illustrated in FIG. 2, the base plate 21 includes an attachment section and a functional component attachment section. The attachment section of the base plate 21 includes a fixing part 27 and the functional component mounting section includes the mounting hole 24. The attachment section has a triangular outer shape. The attachment section is positioned in front of the functional component mounting section. The base plate 21 is fixed to the inner panel 50 at the fixing part 27. Further, the base plate 21 includes two coupling portions 28. The bracket 20 is fixed to the ceiling board 10 at the coupling portions 28 with screws, for example. As illustrated in FIG. 3, the inner panel 50 includes a reinforcing portion 51 at a position corresponding to the fixing part 27. The reinforcing portion 51 extends in the vehicle width direction. The fixing part 27 and the reinforcing portion 51 are fixed with each other by a fastener such as a hook and loop fastener.

As illustrated in FIG. 3, the mount 23 is arranged between the map lamp 30 and the outer panel 60 at a position close to the lamp socket 32A of the map lamp 30. More specifically described, the lamp socket holder 32B holds the lamp sockets 32A such that a part of each lamp socket 32A is positioned between the lower surface of the outer panel 60 and the upper surface of the lamp socket holder 32B. The bracket 20 is arranged such that the mount 23 is positioned above the lamp map 30 so as to cover at least the parts of the lamp sockets 32A. On the upper surface of the mount 23, a shock absorber 40 is provided. The upper surface of the mount 23 is arranged substantially parallel with the lower surface of the outer panel 60 with which the shock absorber 40 is in contact.

As apparent from comparison between FIG. 3 and FIG. 4, the mount 23 and the shock absorber 40 each have a shape elongated in the vehicle width direction. This increases an area of the shock absorber 40 to be contacted with the outer panel 60, and thus force applied to the outer panel 60 dispersed in a larger area.

The shock absorber 40 has a quadrangular block-like shape including two flat surfaces. The flat surfaces are parallel to and in contact with the corresponding one of the upper surface of the mount 23 and the lower surface of the outer panel 60. In assembling, when the ceiling board 10 is mounted to the inner panel 50, the shock absorber 40 is pressed against the outer panel 60 and held between the mount 23 and the outer panel 60 while being compressed. The shock absorber 40 may be made of a hard foaming material obtained by foaming a synthetic resin material such as polypropylene including urethane or a foaming agent, for example.

The shock absorber 40 is in contact with the upper surface of the mount 23 at its lower surface and in contact with the lower surface of the outer panel 60 at its upper surface while the shock absorber 40 is held between the mount 23 and the outer panel 60. With this configuration, the map lamp 30 is less likely to be pushed upward even when a force is applied to the map lamp 30 from below, and thus the loosening of the ceiling hardly occurs.

If the force is applied to the map lamp 30 from below, the shock absorber 40 may be pressed against the outer panel 60, that is, the force is transmitted to the outer panel 60 through the shock absorber 40. However, the force applied to the outer panel 60 is moderate and even for the entire area corresponding to the shock absorber 40. Thus, a local deformation is less likely to occur in the outer panel 60 and a reduction in the exterior appearance quality of the vehicle is less likely to occur. Further, the bracket 20 is fixed to the reinforcing portion 51 of the inner panel 50 at the fixing part 27. Thus, the bracket 20 can be firmly fixed to the inner panel 50.

As described above, the map lamp 30 is attached to the ceiling board 10 through the bracket 20. Further, the bracket 20 includes the mount 23 on which the shock absorber 40 is mounted. Accordingly, the space between the upper surface of the map lamp 30 and the lower surface of the outer panel 60 can be effectively used to reduce the loosening of the ceiling. A conventional roof assembly only has a small mounting area, so that only a small shock absorber is mounted on an upper side of the map lamp 30. Thus, the space between the upper surface of the map lamp 30 and the lower surface of the outer panel 60 cannot be effectively used.

The bracket 20 in the ceiling assembly 1 can be used to cover a surface of any functional component with the mount 23 regardless of a shape of the surface. Therefore, a larger shock absorber such as the shock absorber 40 in comparison to the known configuration can be mounted on the mount 23. In addition, the space between the upper surface of the map lamp 30 and the lower surface of the outer panel 60 can be effectively used to reduce the loosening of the ceiling.

The mount 23 can be freely designed so as to correspond to the shape of the shock absorber 40 and the outer panel 60. Accordingly, the shock absorber 40 can be in contact with the outer panel 60 with moderate force as a whole, and thus the outer panel 60 is less likely to be locally deformed. Particularly, the shock absorber 30 according to this embodiment has a block-like shape having the surface in contact with the mount 23 and the surface in contact with the outer panel 60. Thus, the outer panel 60 hardly deforms. With this configuration, the loosening of the ceiling can be reduced by allowing the shock absorber 40 to be in contact with the outer panel 60 without deteriorating the exterior appearance of the vehicle.

The pillars 22 enable the mount 23 to be positioned near the outer panel 60. This can reduce the thickness of the shock absorber 40 and the cost of the shock absorber 40. Further, the space 25 provided between the adjacent pillars 22 lowers the rigidity of the bracket 20, and thus the bracket 20 can easily absorb the impact. For example, the pillars 22 can be easily broken when a head of a vehicle passenger comes in contact with the ceiling in a collision. Further, the bracket 20 is fixed to the reinforcing portion 51 at the fixing part 27. Thus, the bracket 20 is firmly fixed to the inner panel 50.

Other Embodiments

The present invention is not limited to the embodiments as described above with reference to the drawings. For example, the present invention may include following embodiments.

A plurality of resin ribs may be provided as shock absorber instead of the shock absorber 40. The resin ribs may be integral with the mount 23 and each may be in contact with the lower surface of the outer panel 60 at a top thereof.

The functional component may be an assist grip, a roof monitor, or an air conditioner duct.

(3) The bracket 20 may not include the fixing part 27.

(4) The shock absorber 40 may be in contact with the inner panel 50 instead of the outer panel 60.

What is claimed is:

1. A vehicular ceiling assembly comprising:
   a ceiling board;
   a functional component; and
   a bracket mounted to an upper surface of the ceiling board to fix the functional component to the ceiling board, wherein
   the bracket includes:
      a shock absorber that contacts a lower surface of a roof of a vehicle;
      a mount having a main surface on which the shock absorber is mounted and positioned above the functional component in a vehicle height direction;
      a base plate being arranged along the upper surface of the ceiling board; and
      a plurality of pillars each projecting upward from the base plate to an edge of the mount to support the mount.

2. The vehicular ceiling assembly according to claim 1, wherein
   the bracket is arranged such that the main surface of the mount faces and extends parallel with the lower surface of the roof.

3. The vehicular ceiling assembly according to claim 2, wherein the shock absorber has a first surface parallel with the main surface of the mount and a second surface parallel with the lower surface of the roof.

4. The vehicular ceiling assembly according to claim 1, the pillars are arranged at equal intervals such that the pillars adjacent to each other have a space therebetween.

5. The vehicular ceiling assembly according to claim 4, wherein
   the base plate of the bracket includes a mounting hole at a position corresponding to the mount, the mounting hole having a rectangular shape,
   the pillars are arranged at corners of the mounting hole, thereby providing a housing space surrounded by the pillars and the mount, and
   the functional component is arranged in the housing space.

6. The vehicular ceiling assembly according to claim 5, wherein the mount has a smaller area than the mounting hole of the base plate, whereby the pillars each rise obliquely from an edge of the mounting hole to the edge of the mount.

7. The vehicular ceiling assembly according to claim 4, wherein the base plate of the bracket includes two coupling portions at which the bracket is fixed to the ceiling board.

8. The vehicular ceiling assembly according to claim 4, wherein the base plate of the bracket includes a fixing part, the bracket being fixed to the roof at the fixing part.

9. The vehicular ceiling assembly according to claim 5, wherein
   the base plate of the bracket includes a fixing part, the bracket being fixed to the roof at the fixing part,
   the base plate includes an attachment section and a functional component mounting section, the attachment section including the fixing part, the functional component mounting section including the mounting hole, and
   the attachment section has a triangular outer shape.

10. The vehicular ceiling assembly according to claim 1, wherein
    the functional component includes a clip, and
    the bracket includes a retainer that is engaged with the clip, whereby the bracket fixes the functional component to the ceiling board.

11. The vehicular ceiling assembly according to claim 5, wherein
    the functional component includes four clips,
    the bracket includes four retainers, whereby the bracket fixes the functional component to the ceiling board, and
    the clips are arranged in the space between the pillars such that two of the clips are positioned on each of opposing sides of the mounting hole.

12. The vehicular ceiling assembly according to claim 1, wherein the shock absorber is made of a foamed material.

13. The vehicular ceiling assembly according to claim 1, wherein the functional component is a map lamp.

14. The vehicular ceiling assembly according to claim 13, wherein
    the map lamp includes:
       a light bulb;
       a lamp socket; and
       a lamp socket holder, wherein
    the lamp socket holds the light bulb, the lamp socket holder holds the lamp socket, and the lamp socket holder holds the lamp socket such that a part of the lamp socket is positioned between the roof of the vehicle and the lamp socket holder, and
    the bracket is arranged such that the mount is positioned above the functional component so as to cover at least the part of the lamp socket.

15. The vehicular ceiling assembly according to 14, wherein
the light bulb includes a plurality of light bulbs, and
the lamp socket includes a plurality of lamp sockets.

16. The vehicular ceiling assembly according to claim 1, wherein
the mount is integral with the shock absorber,
the shock absorber includes a plurality of ribs, and
the ribs each contact the lower surface of the roof at a top thereof.

17. A vehicular roof assembly comprising:
the ceiling assembly according to claim 1;
a roof inner panel positioned above the ceiling board of the ceiling assembly; and
a roof outer panel positioned above the roof inner panel, the roof outer panel being an outermost panel of the vehicle, wherein
the ceiling assembly is arranged such that the shock absorber is compressed between a lower surface of the roof outer panel and the mount.

18. The vehicular roof assembly according to claim 17, wherein the bracket included in the ceiling assembly further includes a fixing part, and the bracket is fixed to the roof inner panel at the fixing part.

19. A vehicular ceiling assembly comprising:
a ceiling board;
a bracket including:
  a base plate bonded to an upper surface of the ceiling board;
  pillars projecting from an upper surface of the base plate; and
  a mount including:
    an upper surface that is flat and opposite a lower surface of a roof of a vehicle; and
    a lower surface that faces toward the ceiling board, wherein distal ends of the pillars are connected to the mount;
a functional component disposed between the lower surface of the mount and the upper surface of the ceiling board and fixed to the ceiling board with the bracket; and
a shock absorber mounted on the upper surface of the mount, wherein
the shock absorber has a block-like shape including an upper surface and a lower surface that are both flat,
the upper surface of the shock absorber is pressed against the lower surface of the roof of the vehicle, and
the lower surface of the shock absorber is attached to the upper surface of the mount.

\* \* \* \* \*